(12) United States Patent
Kwiatkowski et al.

(10) Patent No.: US 10,077,974 B2
(45) Date of Patent: Sep. 18, 2018

(54) HIGHLY MOBILE VEHICLE SUSPENSION SYSTEM WITH BLAST MITIGATION FEATURES

(71) Applicant: Pratt & Miller Engineering and Fabrication, Inc., New Hudson, MI (US)

(72) Inventors: Kevin R. Kwiatkowski, Ann Arbor, MI (US); Kris Houghton, Plymouth, MI (US); Celyn M. Evans, Milford, MI (US); Benjamin J. Wright, New Hudson, MI (US)

(73) Assignee: PRATT & MILLER ENGINEERING AND FABRICATION, INC., New Hudson, MI (US)

( * ) Notice: Subject to any disclaimer, the term of this patent is extended or adjusted under 35 U.S.C. 154(b) by 0 days.

(21) Appl. No.: 15/245,724

(22) Filed: Aug. 24, 2016

(65) Prior Publication Data

US 2018/0058821 A1   Mar. 1, 2018

(51) Int. Cl.
| | |
|---|---|
| *F41H 7/04* | (2006.01) |
| *B60G 3/20* | (2006.01) |
| *B60K 17/354* | (2006.01) |
| *B60K 17/16* | (2006.01) |
| *B62D 21/11* | (2006.01) |
| *B60G 3/00* | (2006.01) |

(Continued)

(52) U.S. Cl.
CPC ............... *F41H 7/04* (2013.01); *B60G 3/00* (2013.01); *B60G 3/145* (2013.01); *B60G 3/20* (2013.01); *B60G 17/00* (2013.01); *B60K 17/16* (2013.01); *B60K 17/354* (2013.01); *B62D 5/14* (2013.01); *B62D 21/11* (2013.01); *B62D 63/04* (2013.01); *B60G 2200/13* (2013.01); *B60G 2200/144* (2013.01); *B60G 2200/31* (2013.01); *B60G 2500/00* (2013.01); *B60Y 2200/24* (2013.01)

(58) Field of Classification Search
CPC . F41H 7/04; F41H 7/042; F41H 7/044; F41H 7/00; B60G 3/20; B60G 3/145; B60G 2200/144; B60G 2200/31; B60G 7/008; B60G 7/006; B60K 17/354; B60K 17/16; B62D 21/11; B60Y 2200/24
USPC .................. 280/124.1, 124.128, 124.129
See application file for complete search history.

(56) References Cited

U.S. PATENT DOCUMENTS

| | | | | |
|---|---|---|---|---|
| 3,395,672 A | * | 8/1968 | Ruf .................... | B60F 3/0007 180/24 |
| 4,484,765 A | * | 11/1984 | Appelblatt ............ | B60G 3/14 180/233 |

(Continued)

FOREIGN PATENT DOCUMENTS

WO   WO-2010128297 A1   11/2010

OTHER PUBLICATIONS

Ricardo Ocelot; 2009; 6 pages.

*Primary Examiner* — Keith J Frisby
(74) *Attorney, Agent, or Firm* — Brinks Gilson & Lione

(57) ABSTRACT

In one embodiment, there is disclosed a modular, blast resistant suspension module for an armored vehicle. Each suspension module has a first and second axle assembly. The first axle assembly has a Short-Long Arm (SLA) suspension system pivotally connected to a blast resistant differential housing and the second axle assembly has a Road Arm (RA) suspension system pivotally connected to the differential housing. The suspension modules may be used to form 4×4 or 8×8 vehicle configurations.

15 Claims, 12 Drawing Sheets

(51) Int. Cl.
*B62D 5/14* (2006.01)
*B60G 3/14* (2006.01)
*B60G 17/00* (2006.01)
*B62D 63/04* (2006.01)

(56) References Cited

U.S. PATENT DOCUMENTS

| | | | |
|---|---|---|---|
| 4,492,282 A * | 1/1985 | Appelblatt | B62D 49/0621 |
| | | | 180/68.1 |
| 6,435,071 B1 * | 8/2002 | Campbell | B60G 3/18 |
| | | | 180/41 |
| 8,033,208 B2 | 10/2011 | Joynt et al. | |
| 8,146,478 B2 | 4/2012 | Joynt et al. | |
| 8,430,196 B2 * | 4/2013 | Halliday | B60K 5/00 |
| | | | 180/89.1 |
| 2011/0138994 A1 * | 6/2011 | Joynt | F41H 7/042 |
| | | | 89/36.08 |
| 2012/0043152 A1 | 2/2012 | Jacob-Lloyd | |

* cited by examiner

HIGHLY MOBILE VEHICLE SUSPENSION SYSTEM WITH BLAST MITIGATION FEATURES

STATEMENT OF GOVERNMENT INTEREST

This disclosure was made in part with Government support by The United States Department of the Army. The Government has certain rights in the disclosure.

TECHNICAL FIELD

This disclosure relates to suspension systems, including those that may be used with vehicles such as military vehicles. In one embodiment, the disclosure relates to a suspension system module designed for a military vehicle to enhance mobility performance and which is integrated with blast mitigating structures of the military vehicle. Each suspension system module includes a Short-Long Arm (SLA) suspension for a first axle assembly and a Road Arm (RA) suspension for a second axle assembly. Both suspension systems are connected to a blast mitigating differential housing. The suspension module includes a steering system for the first axle assembly as well as drive train components (differentials, drive shafts, CV's etc.) necessary to drive wheels at least on the first and second axles. The suspension system includes blast mitigating properties to clean up the underbody profile of a military vehicle and facilitate dissipation of blast energy from an IED or mine.

BACKGROUND

Existing military vehicles are generally made of a monocoque construction mounted on a set of wheels. In recent years, there has been a move toward blast resistant hull designs that deflect the blast force away from the vehicle hull. However, such designs have not been entirely optimal in protecting the suspension systems of such vehicle with the result that the blast force does not significantly harm the vehicle hull, but does damage the suspension and drive systems so that the occupants are stranded in an incapacitated vehicle.

Improvements are needed in suspension and drivetrain protection, so that the vehicle is driveable after a blast event and the occupants are not left stranded in a disabled vehicle after such an event. The suspension system should provide maximum rebound and jounce, while surviving blast events. The suspension system should also permit selectable disengagement of damaged wheel assemblies so the vehicle maintains maximum drivability during combat situations.

DETAILED DESCRIPTION

All figures and examples herein are intended to be non-limiting; they are merely exemplary iterations and/or embodiments of the claims appended to the end of this description. Modifications to structure, materials, the order of steps in procedures, etc., are contemplated.

Figure 1:
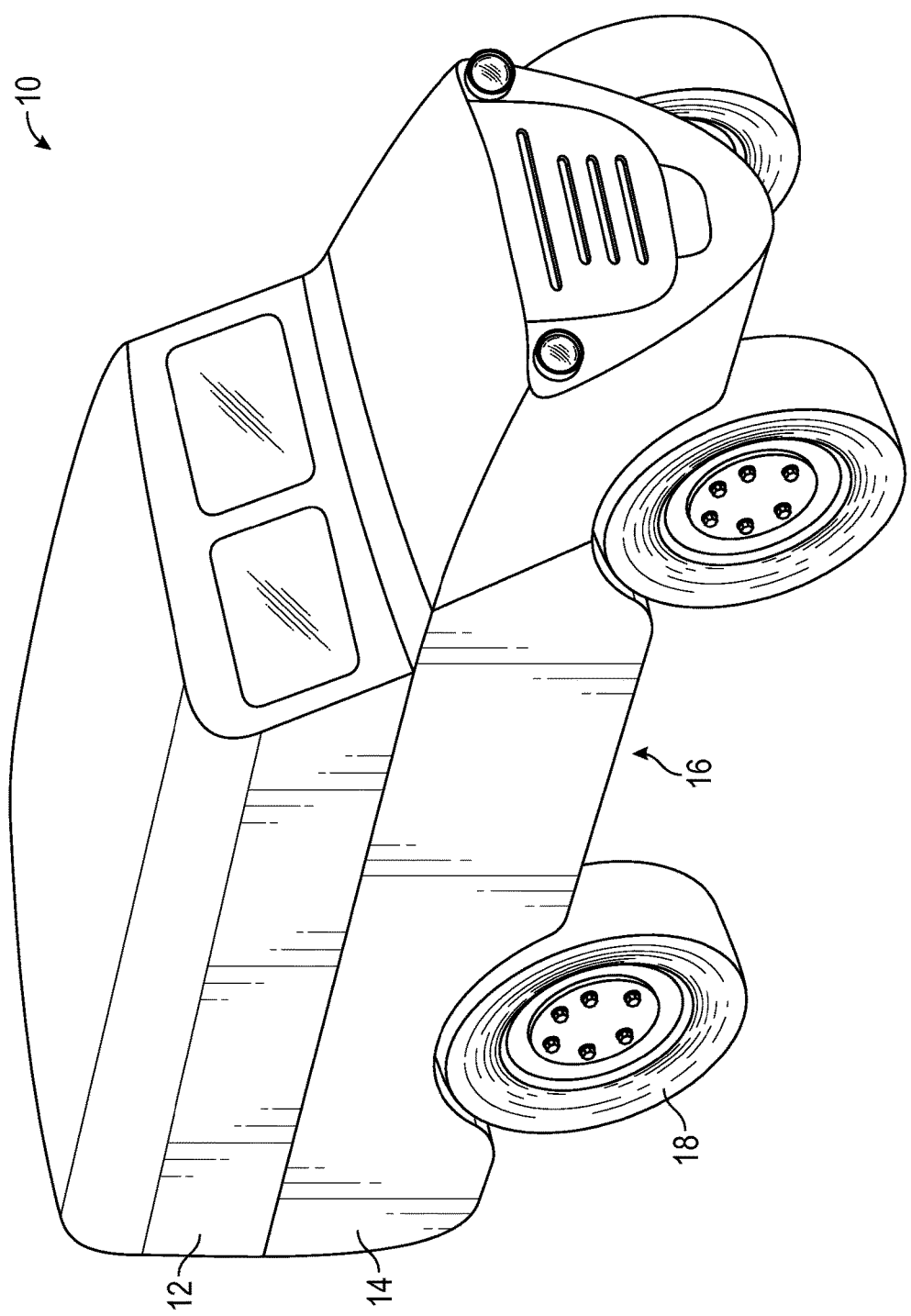
FIG. 1 is a perspective view of a vehicle including a blast resistant suspension according to one embodiment of the disclosure.

Referring now to the Drawings wherein like numbers refer to like structures, FIG. 1 shows a vehicle 10 which is shown as a military vehicle. The vehicle may include a monocoque body 12 comprised of a blast resistant sheet material with an upper hull 14 with an underside 16. For purposes of this application, hulls are understood to be the main frame or the main body of a vehicle such as an all terrain vehicle, an armored personnel carrier, or a tank. In this embodiment, the underside may be substantially V shaped. The underside has suspension and wheel assemblies 18 attached to the underside and driveably connected to a drive train to move the vehicle as required by an operator.

Figure 2:
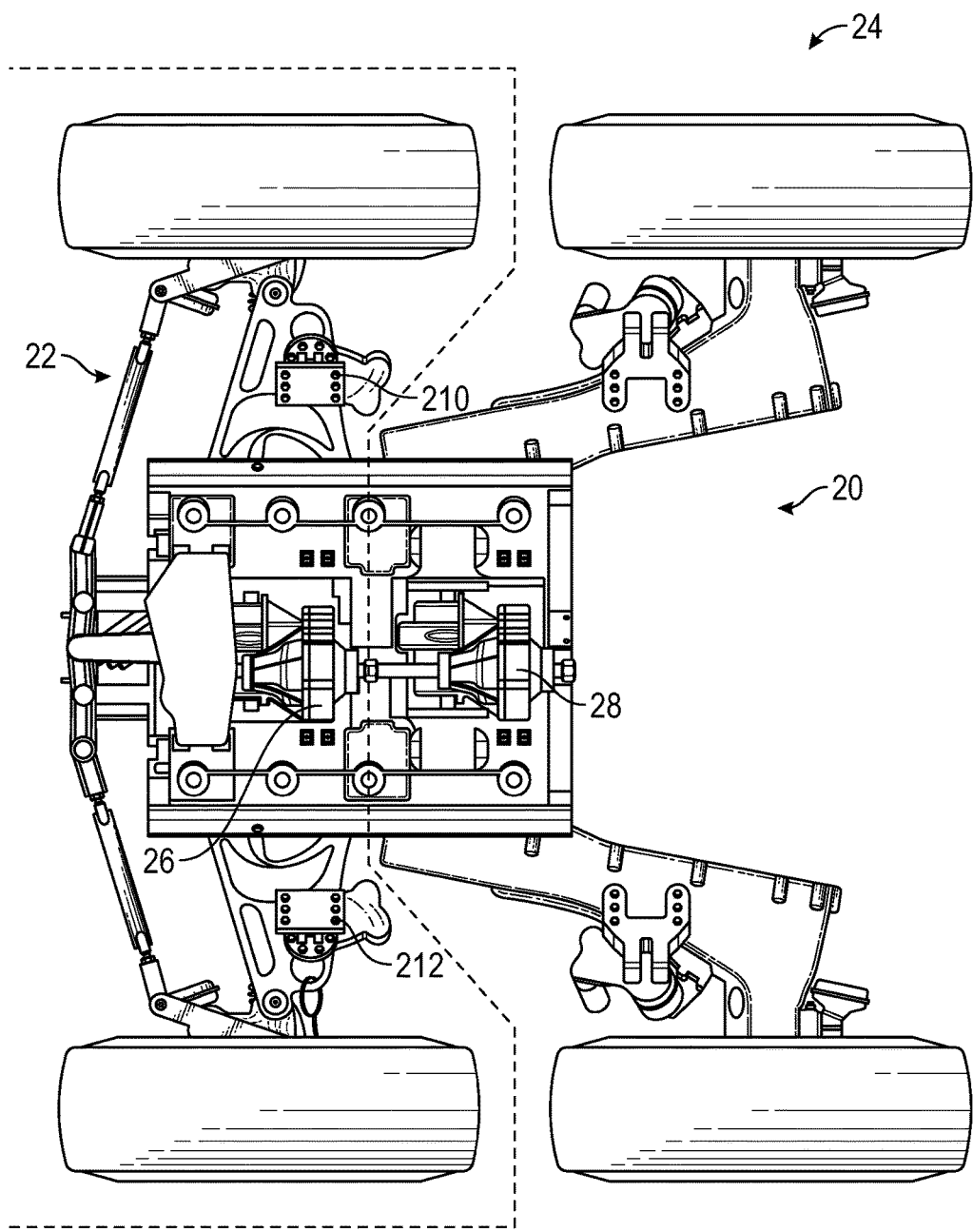
FIG. 2 is top plan view of a suspension module with a blast mitigating differential housing according to one embodiment of this disclosure.

FIG. 2 is a top plan view of a suspension system module 20, having a first axle assembly 22 and a second axle assembly 24. The first axle assembly is driveably connected to a first differential 26 and the second axle assembly is driveably connected to a second differential 28.

Figure 3:
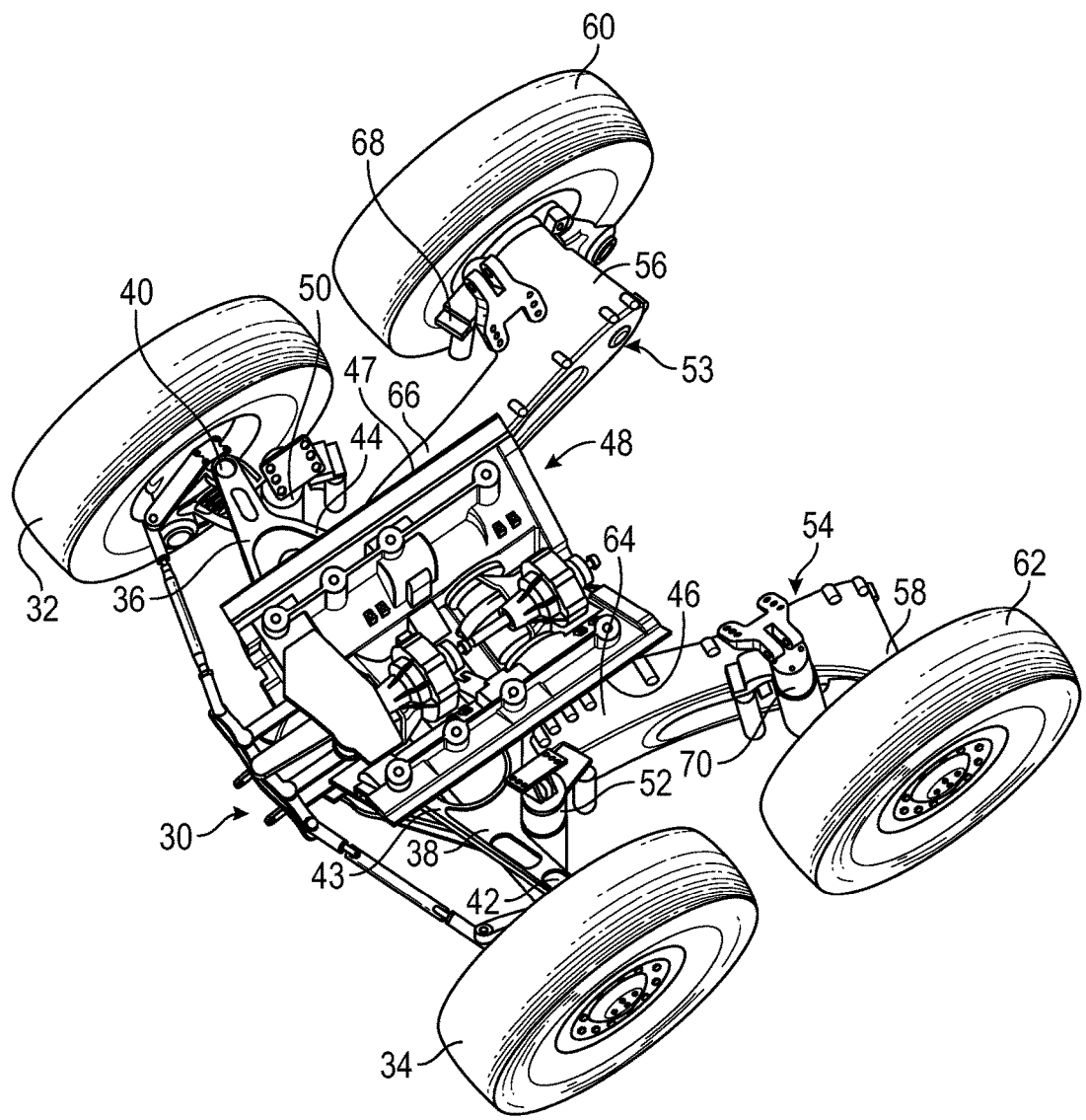
FIG. 3 is a perspective view of the suspension module of FIG. 1.

FIG. 3 is a perspective view of the suspension system module of FIG. 2. The first axle assembly includes a steering assembly 30 to turn front axle assembly wheel and tire assemblies 32, 34, respectively. The first axle assembly further includes Short-Long Arm (SLA) assembly 36, 38 in pivotal connection at a first end 40, 42 to each of the first axle wheel and tire assemblies. Each SLA is pivotally connected at a second end 43, 44 to opposing sides 46 of a differential housing 48. Each SLA further includes a spring and damper assembly 50, 52. The second axle assembly includes Road Arm Suspension Assemblies (RA) 53, 54 driveably connected at a first end 56, 58 to wheel and tire assemblies 60, 62, respectively. Each RA is pivotally connected at a second end 64, 66 respectively, to opposing sides of the differential housing and driveably connected to a drive train differential within the differential. Each RA may further include a spring and damper assembly 68, 70, respectively.

Figure 4:
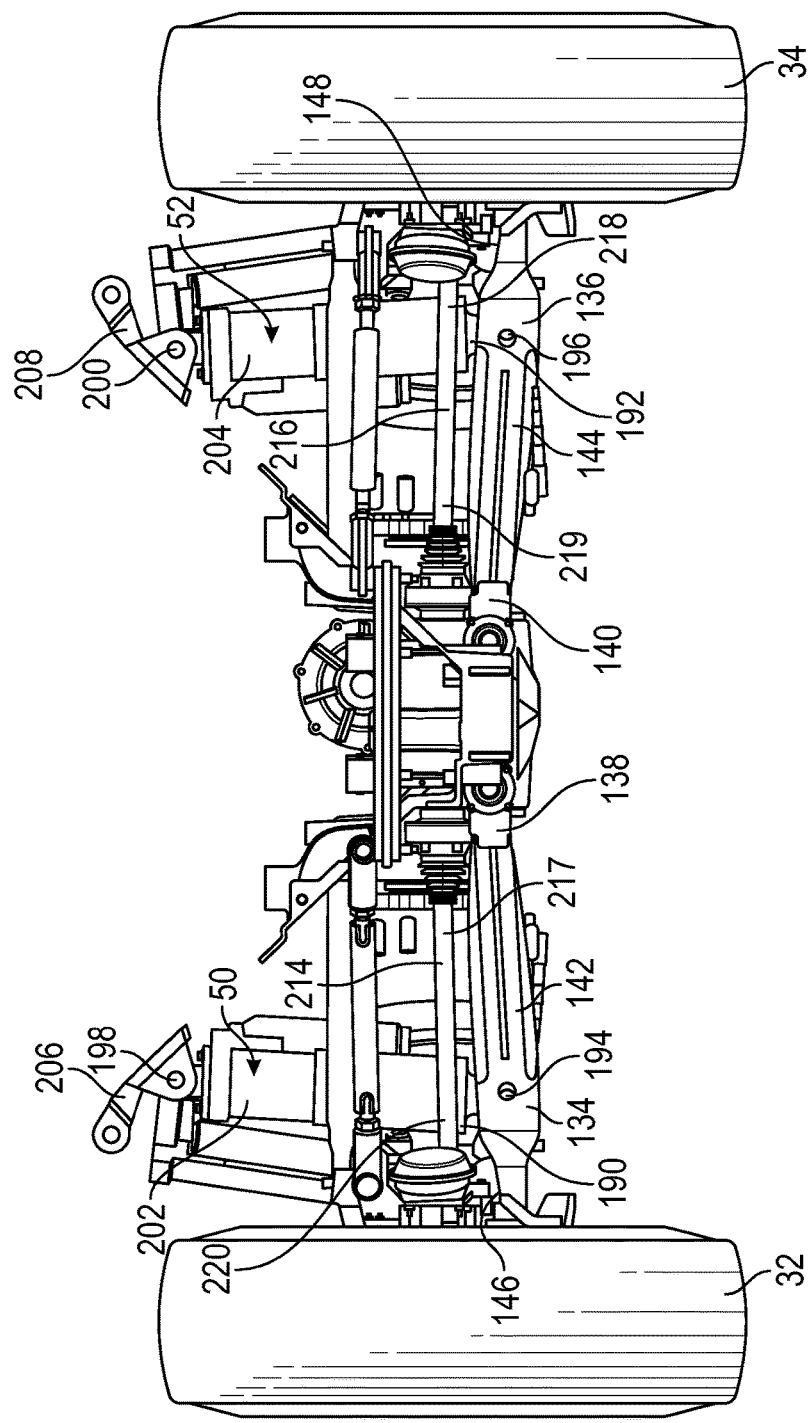
FIG. 4 is a front view of the suspension module of FIG. 1.
Figure 5:
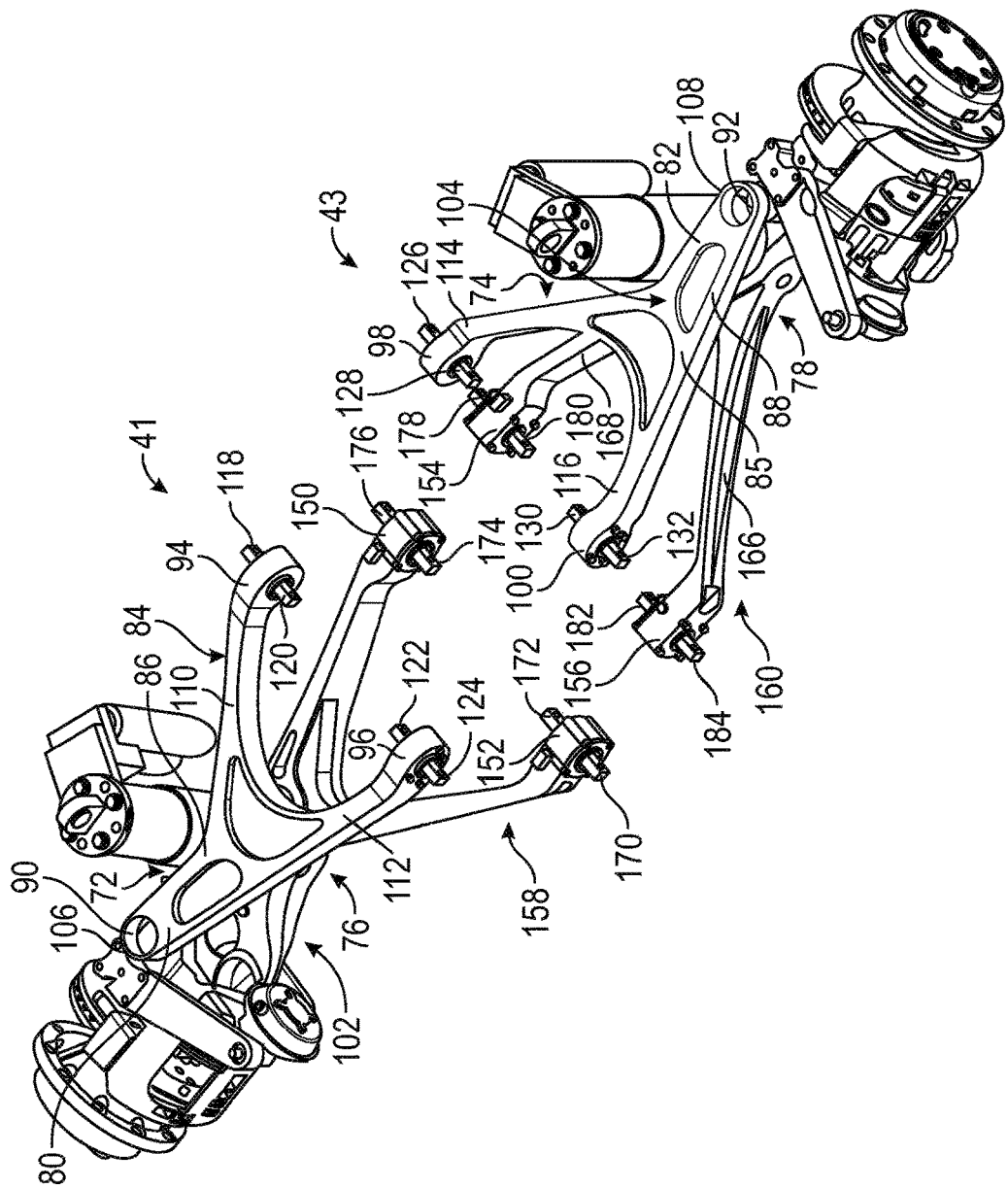
FIG. 5 is a detailed view of a Short Long Arm (SLA) suspension assembly according to one embodiment of the disclosure.

Turning now to FIGS. 4 and 5, the structure of the SLA will be described. Specifically, in this non limiting embodiment, each SLA has an upper arm 72, 74, and a lower arm 76, 78 respectively. Each of the upper arms is of the same length as each other and each of the lower arms is of the same length as each other. However, the upper arms are of a shorter length than the lower arms, hence the designation "Short-Long Arm". Each upper arm has a first end 80, 82, and an opposed second end 84, 84, separated by a length 86, 88, respectively. Each upper arm first end is pivotally connected at an upper arm outer pivot 90, 92, respectively, to a separate wheel end assembly. Each upper arm is pivotally connected at its second end by upper arm inner pivots 94, 96, 98, and 100, respectively. As shown in FIG. 5, the upper arm may be a Y shaped member 102, 104, with the outer pivot at the base 106, 108 of the Y member, and the inner pivots may be carried on each opposed SLA arm members 110, 112, 114, 116, respectively. Each of the inner arm pivots may include axial pivots 118, 120, 122, 124, 126, 128, 130, 132, respectively, to facilitate pivotal movement about an axis. One skilled in the art understands that any pivot connection may be utilized, and the embodiment depicted is merely exemplary, not limiting. It will be appreciated that in certain embodiments, the right upper arm may be of a different length than the left upper arm, and the right lower arm may be of a different length than the left lower arm. This arrangement may be used where vehicle design requires such dimensioning of the upper and lower arms to provide suitable steerability of the vehicle. In addition, it is also contemplated that Macpherson suspension or a Multilink suspension system could also be used.

The lower arms of the SLA have a similar construction as the upper arms. Specifically, each lower arm 76, 78. Each lower arm has a first end 134, 136, and an opposed second end 138, 140, separated by a length 142, 144, respectively. Each lower arm first end is pivotally connected at a lower arm outer pivot 146, 148, respectively, to a separate wheel end assembly. Each lower arm is pivotally connected at its second end by lower arm inner pivots 150, 152, 154, and 156, respectively. As shown in FIG. 5, the lower arm may be a Y shaped member 158, 160, with the outer pivot at the base of the Y member, and the inner pivots may be carried on each opposed lower SLA arm members 166, 168, respectively. Each of the lower inner arm pivots may include axial pivots 170, 172, 174, 176, 178, 180, 182, 184, respectively, to facilitate pivotal movement about an axis. One skilled in the art understands that any pivot connection may be utilized, and the embodiment depicted is merely exemplary, not limiting. ent depicted is merely exemplary, not limiting.

The spring and damper assemblies 50, 52 are pivotally attached at a first end 190, 192 respectively to the respective lower arm at pivots 194, 196, and, as seen in FIGS. 2 and 3, pivotally attached by pivots 198, 200 at a second end 202, 204 to plates 206 and 208 which may be equipped with apertures 210, 212 so that the second end may be affixed as by fasteners to the vehicle underside or a frame member, respectively.

The first axle assembly may further be provided with axles 214 and 216 which are each drivable connected to their respective wheel end assemblies as at first ends 218 and 220, respectively. Each axle is driveably connected at their respective second ends to a differential in any manner, and will be hereinafter described.

Figure 6:
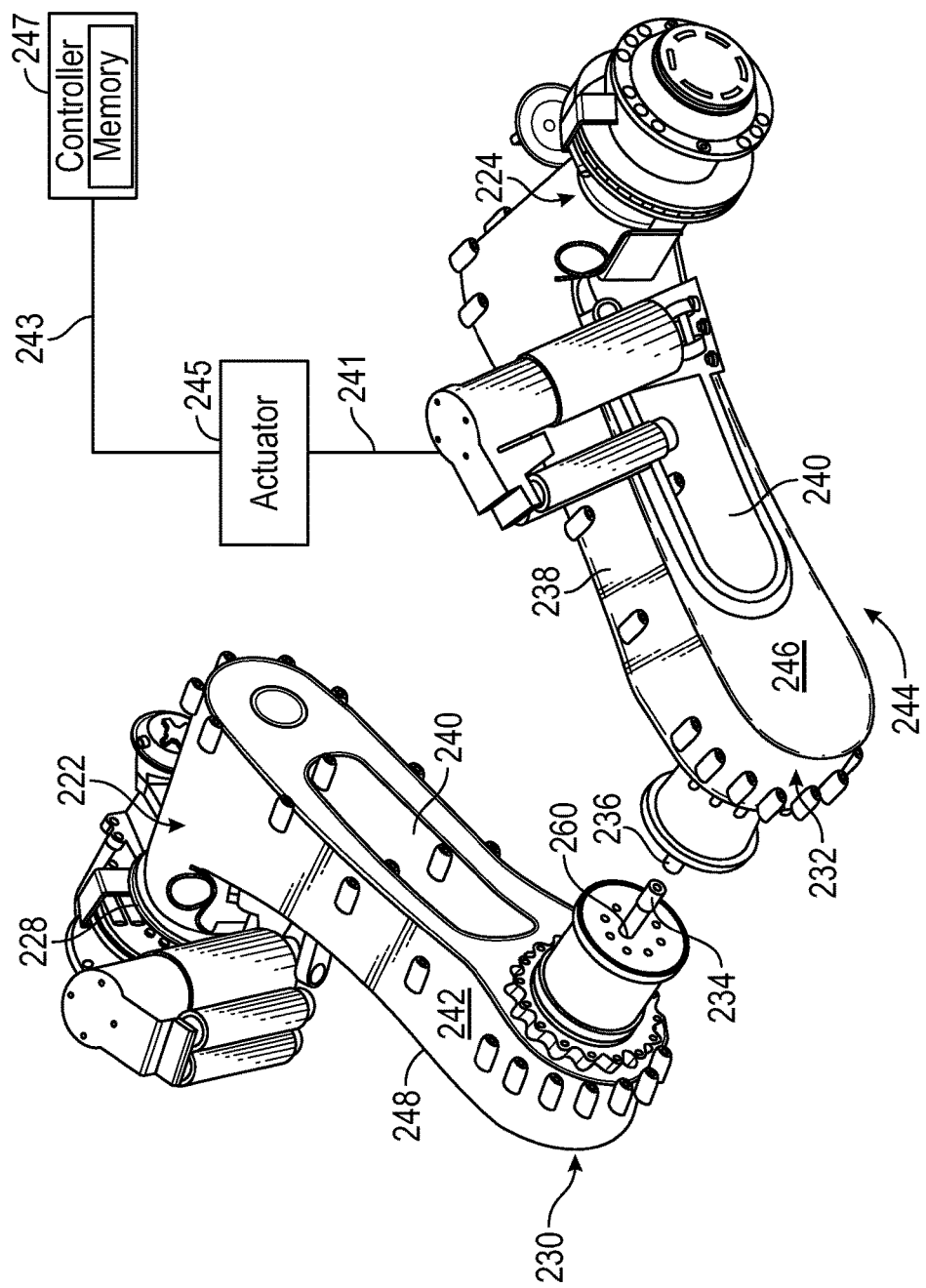
FIG. 6 is a detailed perspective view of a Rear Arm (RA) suspension assembly according to one embodiment of the disclosure.
Figure 11:
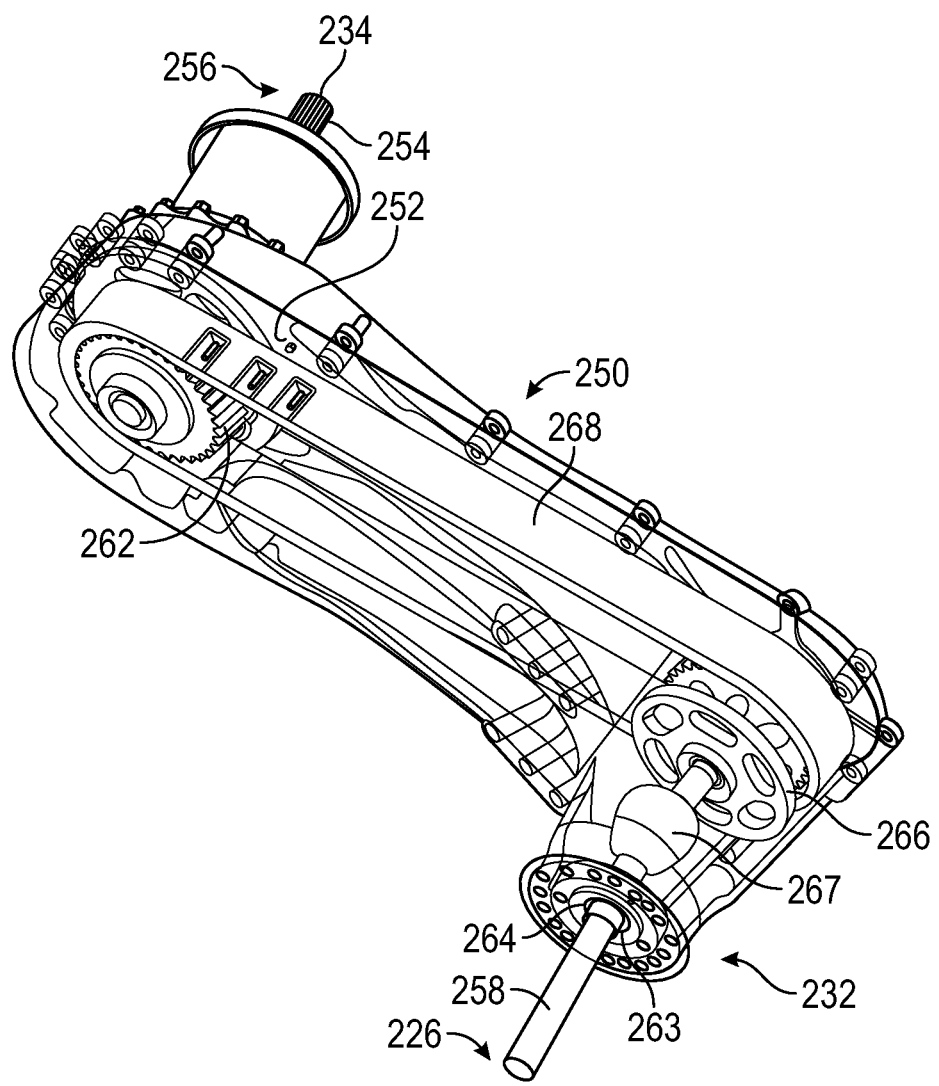
FIG. 11 is a cutaway view of the RA of FIG. 6.

FIGS. 6 and 11 will now be described. The second axle assembly includes a pair of opposed RAs. Each RA has a Road Arm first end 222, 224 with Road arm outer pivots 226, 228, respectively. Each RA has a Road Arm second end 230, 232, with Road Arm inner pivots 234, 236, respectively. In this embodiment, the RA first and second ends are in opposed, substantially parallel orientation with each other and separated by a body portion 238 oriented at substantially a right angle to the first and second ends. Each of the outer pivots is driveably connected to a respective second axle assembly wheel end assembly, and each of the inner pivots is driveably connected to the second axle assembly differential 26. The body has an aperture 240 along its length which dissipates blast energy during a blast event.

Turing now to FIG. 11, it can be seen that each RA has a top 242 and bottom 244 separated by sidewalls 246, 248 extending substantially unbroken therebetween to define an outer shell 250 and an inner space 252. Each inner pivot is an input shaft 254, which may be splined at its first end as at 256 to ensure driveable connection to the differential and each outer pivot is an output shaft 258. The input shaft extends through an aperture 260 in the outer shell into the inner space.

The RAs are engageable or disengageable by an operator depending upon conditions in which the vehicle is operated. Specifically, controller 247 includes a memory such as ROM, PROM, EPROM, EEPROM, FLASH or any other memory with instructions stored in memory. The controller is electronically connected to an actuator 245, which may be hydraulic, pneumatic, electronic or any other actuator, through a controller area network (CAN) 243 or any other electronic connection. The actuator is operably connected as at 241 to the damper assembly. When an operator desires or when conditions require, a command signal is transmitted from the controller to the actuator, which, depending upon what actuator is used, either moves a fluid to or from the damper or electronically activates the dampers to raise the RA and its tire assembly away from ground engagement. This movement of the RA may also be used to enhance turning and mobility of the vehicle.

Each outer pivot is an output shaft extending through an aperture 264 in the outer shell into the inner space. The apertures through which the input shaft and output shaft extend may be provided with a seal 263 to retain lubrication and prevent dirt and debris from entering the inner space. Each output shaft is driveably connectable to an output gear 266 in the inner space through a CV joint 267 so that the output shaft may be pivotal about the CV joint. The rotation of the input gear is transmitted to the output gear by a drive chain 268 extending between the input gear and the output gear.

Figure 7:
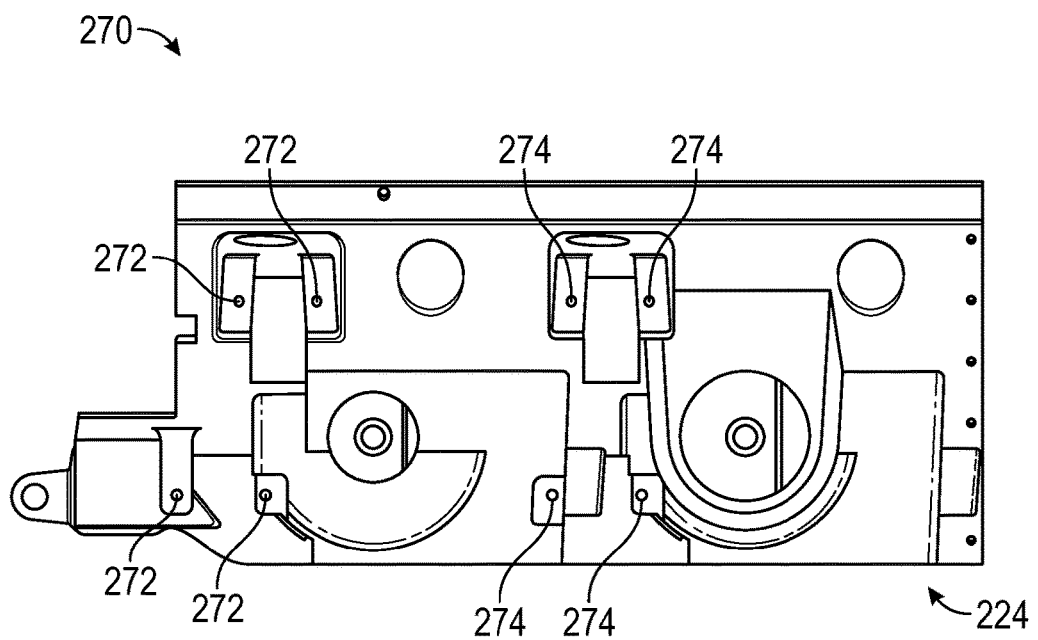
FIG. 7 is side view of a blast mitigating differential housing according to one embodiment of the disclosure showing suspension mounting points.

FIG. 7 is a side view of a blast mitigating differential housing 270 according to one embodiment of the disclosure showing suspension mounting points. Specifically, the differential housing is generally V shaped and houses a first and second differential as previously described. The differential housing connects the suspension and the drivetrain to the rest of the vehicle structure. This housing is the subject of co-pending U.S. patent application Ser. No. 14/621,342 which is incorporated herein in its entirety by reference. Suspension mounting points 272 are for the SLA and suspension mounting points 274 are for the RA.

Figure 8:
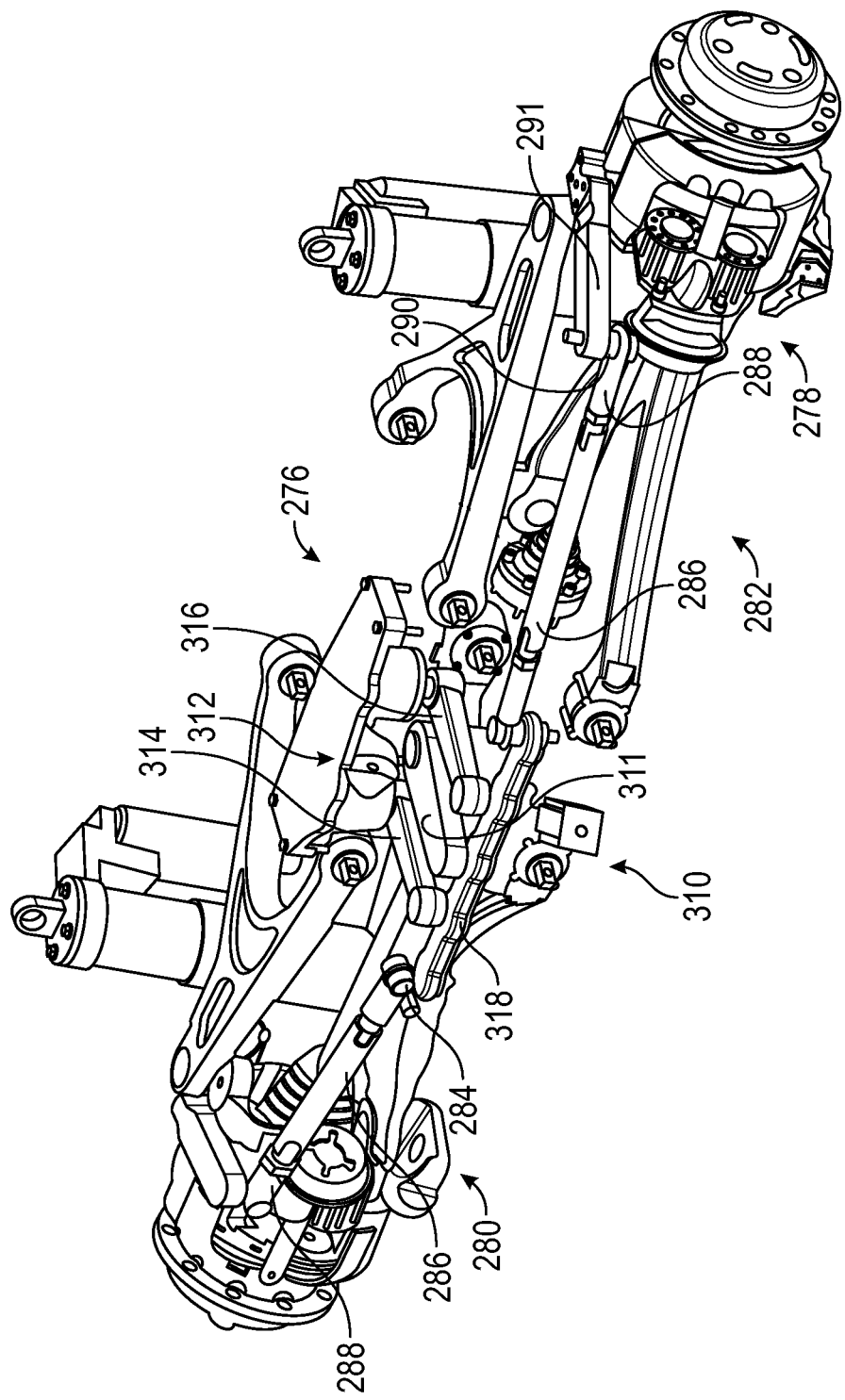
FIG. 8 is a perspective view of an SLA suspension assembly showing drive axles and a steering system according to one embodiment of the disclosure.
Figure 9:
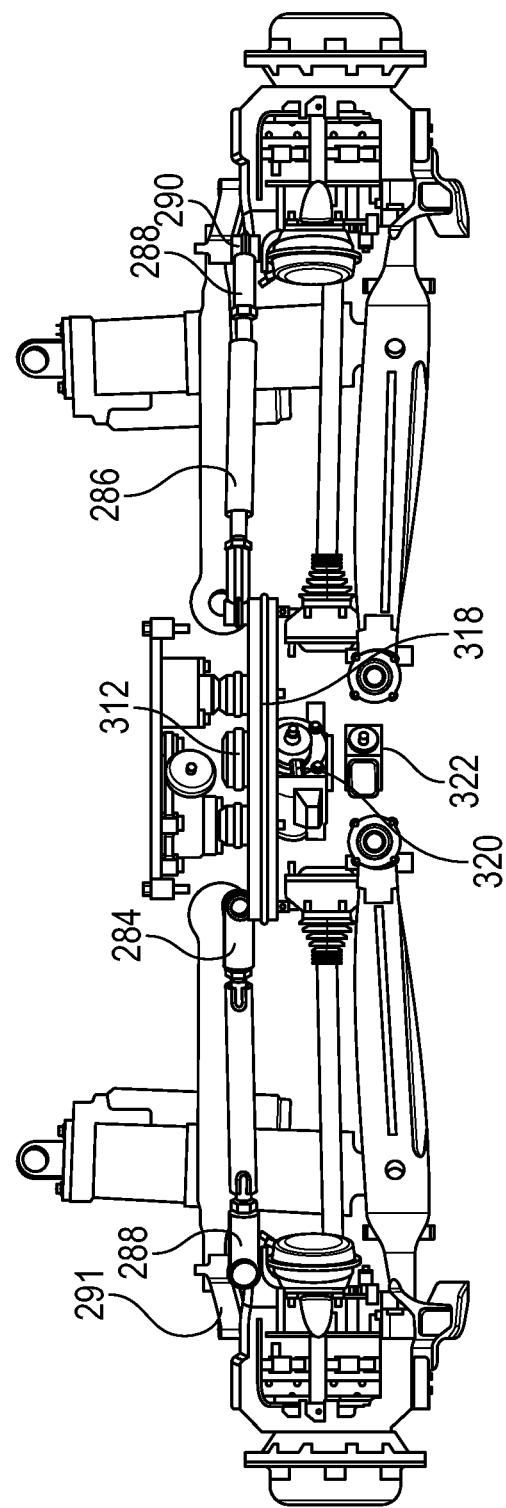
FIG. 9 is an exploded front view of the SLA suspension of FIG. 8
Figure 10:
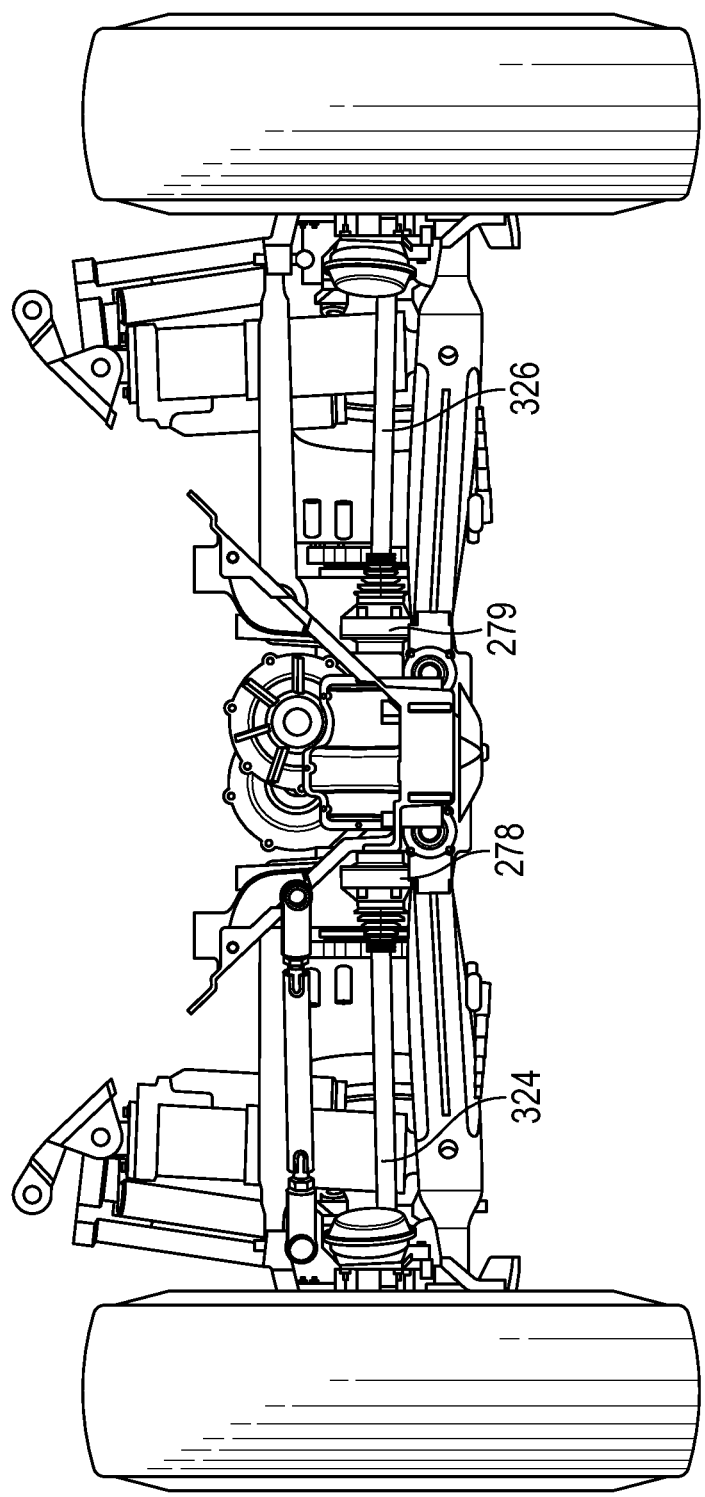
FIG. 10 is an assembled front view of the SLA suspension assembly of FIG. 8.

FIGS. 8, 9 and 10 all depict various aspects of the SLA according to one embodiment of the disclosure showing the steering mechanism 276 and the CV joint assemblies 278, 279 used to drive the wheel end assemblies of the first axle assembly.

Specifically, and referring to FIGS. 8 and 9, the first axle assembly may include tie rod assemblies 280 and 282 respectively. Each tie rod has an inner tie rod end 284, a tie rod adjustment sleeve 286 and an outer tie rod end 288. The outer tie rod ends are pivotally connected at tie rod end ball joints 290 to a connecting linkage 291 and thence to a respective wheel end assembly. The assembly of the tie rods and the connecting rod forms a steering linkage assembly 310. The first axle assembly may further be provided with a pitman and idler support 312 having a pitman 311, and idler arms 314 and 316 in spaced apart relationship to accommodate a centerlink 318 to translate motion to the centerlink and thereby turn the wheel end assemblies. This may be accomplished by a hydraulic steering gearbox 320 actuated by an electric motor 322 so that turning motion of a steering wheel is translated into directional turning of the wheel end assemblies.

FIG. 10 further depicts an embodiment of the SLA showing the CV joint assemblies 278, 279 connected to the differential housing through CV joints. Specifically, each CV assembly includes a drive axle 324, 326 that is driveably connected to a respective wheel end assembly. The respective drive axles transmit rotational force from the respective differential to the respective wheel end to drive the vehicle.

Figure 12:
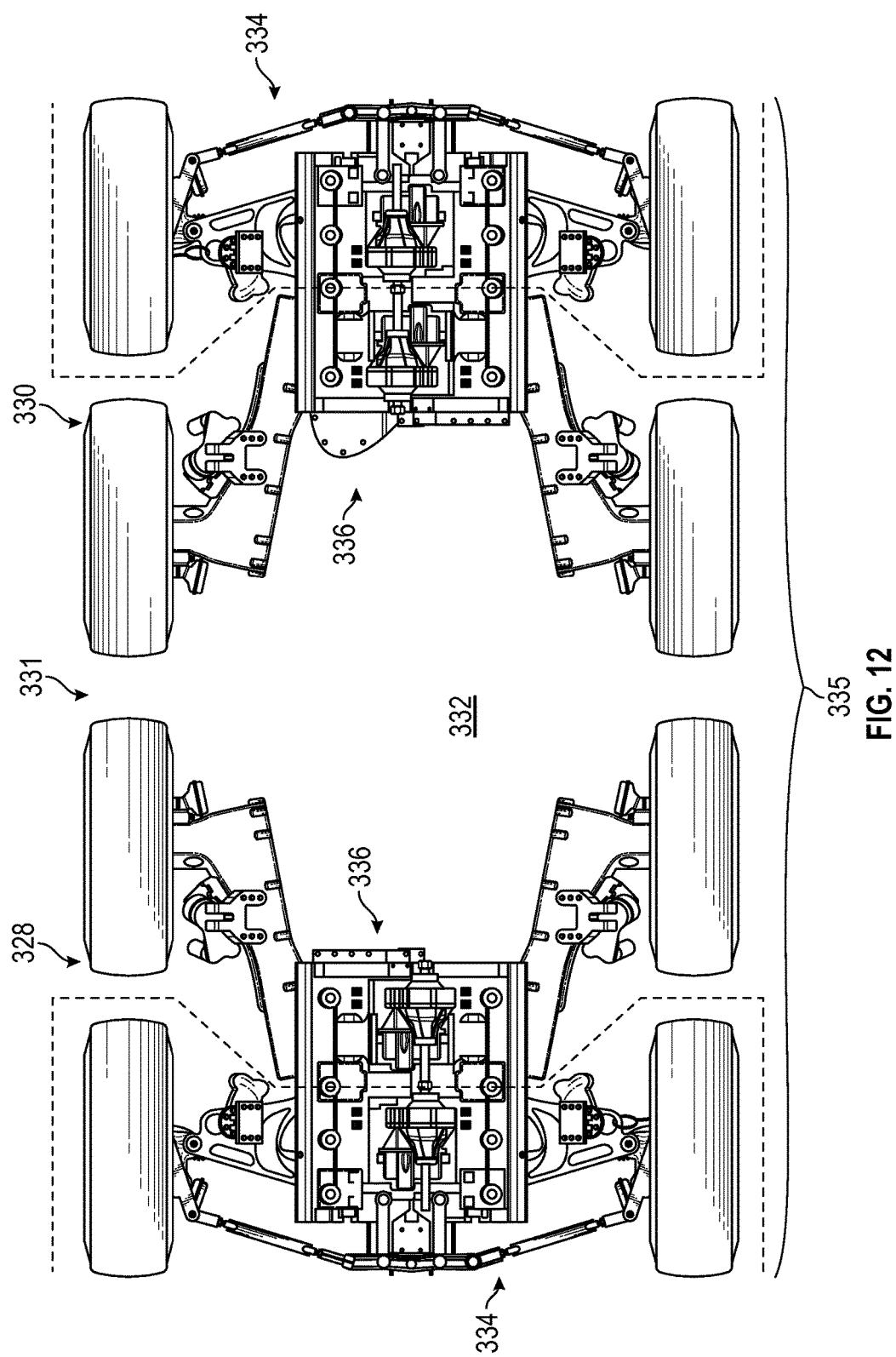
FIG. 12 is a bottom view of a vehicle equipped with two suspension modules and blast mitigating differential housings in an 8×8 configuration according to one embodiment of the disclosure.

It is understood that what has hereto been describe is a 4×4 configuration utilizing one suspension module. In the field of military vehicles, the suspension module as described may be used in an 8×8 configuration 298, as shown in FIG. 12. Specifically a first suspension module 300 and second suspension module 302 may be oriented in spaced apart relation to each other along the length of the vehicle such that an open space 304 exists between them. In this embodiment, the first suspension module and second suspension module are oriented such that the first axle assembly 306 of the first suspension module and the first axle assembly 308 of the second suspension module are outermost axle assemblies 310, and the first suspension module second axle assembly and the second suspension module second axle assembly are innermost axle assemblies 312.

Although the steps of the above-described processes have been exemplified as occurring in a certain sequence, such processes could be practiced with the steps performed in a different order. It should also be understood that certain steps could be performed simultaneously, that other steps could be added, or that certain steps could be omitted. In other words, the descriptions of the processes are provided for the purpose of illustration, and should not limit the claimed invention.

Accordingly, it is to be understood that the above description is intended to be illustrative and not restrictive. Many embodiments and applications other than the examples provided would be apparent upon reading the disclosure. The scope of the invention should be determined with reference to the appended claims along with the full scope of equivalents. It is intended that future developments will occur, and that embodiments of the disclosed systems and methods will incorporate and be incorporated with such future developments.

Use of singular articles such as "a," "the," "said" together with an element means one or more of the element unless a claim expressly recites to the contrary.

What is claimed as new and desired to be protected by Letters Patent of the United States is:

1. A suspension system, comprising:
   a suspension module having a first axle assembly and a second axle assembly;
   each axle assembly connected at a first end to a wheel end assembly;
   each suspension module connected to a blast mitigating differential housing;
   the first axle assembly equipped with a Short-Long Arm (SLA) suspension for each wheel end assembly;
   each SLA suspension including an upper arm member and an opposed lower arm member, each upper arm member having a length separating a first end and an opposed second end;
   each lower arm member having a length terminating in a first end and an opposed second end;
   each upper arm member of shorter length than each lower arm member;
   the first end of each upper arm member terminating in an upper arm outer pivot;
   each upper arm outer pivot pivotally connectable to a first pivot on the wheel end assembly;
   the first end on each lower arm pivot terminating in an outer pivot;
   each lower arm outer pivot pivotally connectable to a second pivot on the wheel end assembly;
   each second end on each upper arm member terminating in multiple inner pivots;
   each upper arm multiple inner pivots pivotally connectable to the differential housing;
   the first axle assembly further equipped with an SLA suspension spring and damper assembly pivotally connected at one end to one of the upper and lower arm members;
   the second axle assembly equipped with a Road Arm (RA) suspension;
   the RA suspension having a length separating a first end and a second end;
   the first end having an RA outer pivot driveably connectable to a wheel end assembly;
   the second end having an RA inner pivot;
   the RA inner pivot connectable to the differential housing;
   the RA suspension further equipped with an RA spring and damper assembly;
   the RA spring and damper assembly pivotally attached at one end to an associated RA;
   the RA suspension length having an aperture therethrough extending along the length between the first and second ends.

2. The suspension system of claim 1, wherein the first axle assembly comprises:
   a steering assembly;
   the steering assembly including tie rods;
   each tie rod pivotally connected at a first end to a wheel end assembly and pivotally connected at a second end to a center link;
   the center link interactively connected to a Pitman arm;
   the Pitman arm interactively connected to a Pitman and idler support;
   the Pitman and idler support equipped with opposed idler arms and a hydraulic steering gear box; and
   the hydraulic steering gearbox actuated by an electric motor.

3. The suspension system of claim 1, wherein:
   the RA suspension has a top and bottom separated by sidewalls extending substantially unbroken therebetween to define an outer shell and an inner space;
   the outer pivot is an output shaft and each inner pivot is an input shaft;
   the input shaft extending through an aperture in the outer shell into the inner space;
   the input shaft driveably connectable to an input gear in the inner space; each outer pivot is an output shaft extending through an aperture in the outer shell into the inner space;
   the output shaft driveably connectable to an output gear in the inner space;
   the RA suspension further equipped with a drive chain extending between the input gear and the output gear.

4. The suspension system of claim 3, wherein an RA output shaft is driveably connected to an output gear by a constant velocity joint assembly.

5. The suspension system of claim 1, wherein the suspension system further includes an axle driveably connected at one end to a differential in the differential housing, and at an opposite end driveably to the wheel end assembly.

6. The suspension system of claim 5, wherein each axle of the suspension system is driveably connected to the differential by a constant velocity joint assembly.

7. The suspension system of claim 1, further including a controller with memory and instructions; the controller electronically connected to an actuator, the actuator connected to the RA spring and damper assembly; wherein instructions from the controller to the actuator cause the actuator to affect the RA spring and damper assembly to move the RA suspension from an engaged position and a disengaged position.

8. A vehicle, comprising:
at least one transmission differential;
the transmission differential contained within a differential housing;
the differential housing having a blast mitigating profile;
a suspension system, the suspension system including at least one suspension module having a first axle assembly and a second axle assembly;
each axle assembly connected at a first end to a wheel end assembly;
each suspension module connected to a blast mitigating differential housing;
the first axle assembly equipped with a Short-Long Arm (SLA) suspension for each wheel end assembly;
each SLA suspension including an upper arm member and an opposed lower arm member, each upper arm member having a length separating a first end and an opposed second end;
each lower arm member having a length terminating in a first end and an opposed second end;
each upper arm member of shorter length than each lower arm member;
the first end of each upper arm member terminating in an upper arm outer pivot;
each upper arm outer pivot pivotally connectable to a first pivot on the wheel end assembly;
the first end on each lower arm pivot terminating in an outer pivot; each lower arm outer pivot pivotally connectable to a second pivot on the wheel end assembly;
each second end on each upper arm member terminating in multiple inner pivots;
each upper arm multiple inner pivots pivotally connectable to the differential housing;
the first axle assembly further equipped with an SLA suspension spring and damper assembly pivotally connected at one end to one of the upper and lower arm members at one end;
each first axle assembly further includes an axle driveably connected at one end to a differential in the differential housing, and at an opposite end driveably to the wheel end assembly;
the second axle assembly equipped with a Road Arm (RA) suspension;
the RA suspension having a length separating a first end and a second end;
each first end having an RA outer pivot drivably connectable to a wheel end assembly;
each second end having an RA inner pivot;
the RA inner pivot connectable to the differential housing;
the RA suspension further equipped with an RA spring and damper assembly;
the RA spring and damper assembly pivotally attached at one end to an associated RA;
the RA suspension length having an aperture therethrough extending along the length between the first and second ends; and
the RA outer pivot is an output shaft driveably attached to the differential and each RA inner pivot is an input shaft driveably connected to the wheel end assembly.

9. The vehicle of claim 8, wherein the first axle assembly comprises:
a steering assembly;
the steering assembly including tie rods;
each tie rod pivotally connected at a first end to a wheel end assembly and pivotally connected at a second end to a center link;
the center link interactively connected to a Pitman arm;
the Pitman arm interactively connected to a Pitman and idler support;
the Pitman and idler support equipped with opposed idler arms and a hydraulic steering gear box; and
the hydraulic steering gearbox actuated by an electric motor.

10. The vehicle of claim 8, further comprising:
wherein the RA suspension has a top and bottom separated by sidewalls extending substantially unbroken therebetween to define an outer shell and an inner space;
the outer pivot is an output shaft and each inner pivot is an input shaft;
the input shaft extending through an aperture in the outer shell into the inner space;
the input shaft driveably connectable to an input gear in the inner space;
the output shaft extending through an aperture in the outer shell into the inner space; each output shaft driveably connectable to an output gear in the inner space; and
the RA suspension further equipped with a drive chain extending between the input gear and the output gear.

11. The vehicle of claim 8, wherein an RA output shaft is driveably connected to an output gear by a constant velocity joint assembly.

12. The vehicle of claim 8, wherein each axle of the suspension system is driveably connected to the differential by a constant velocity joint assembly.

13. The vehicle of claim 8, wherein the vehicle further comprises:
first and second suspension modules;
the first suspension module in spaced apart relationship to the second suspension module along a length of the vehicle's underside; and
the first suspension module and the second suspension module oriented such that a first axle assembly of the first suspension module and a first axle assembly of the second suspension module are outermost axle assemblies, and a first suspension module second axle assembly and a second suspension module second axle assembly are innermost axle assemblies.

14. The vehicle of claim 8, further comprising:
a controller with memory and instructions; and
the controller electronically connected to an actuator; the actuator connected to the RA spring and damper assembly, wherein instructions from the controller to the actuator cause the actuator to affect the RA spring and damper assembly to move the RA suspension from an engaged position and a disengaged position.

15. The vehicle of claim 8, wherein the first axle assembly is driveably connected to a first transmission differential and the second axle assembly is driveably connected to a second transmission differential.

\* \* \* \* \*